INVENTOR.
HARVEY H. HUNTER
ATTORNEY

INVENTOR.
HARVEY H. HUNTER
ATTORNEY

INVENTOR.
HARVEY H. HUNTER

May 5, 1964   H. H. HUNTER   3,132,037
XEROGRAPHIC TRANSFER METHOD
Filed April 4, 1960   6 Sheets-Sheet 4

INVENTOR.
HARVEY H. HUNTER
BY
ATTORNEY

INVENTOR.
HARVEY H. HUNTER

United States Patent Office 3,132,037
Patented May 5, 1964

3,132,037
XEROGRAPHIC TRANSFER METHOD
Harvey H. Hunter, Columbus, Ohio, assignor, by mesne assignments, to Xerox Corporation, Rochester, N.Y., a corporation of New York
Filed Apr. 4, 1960, Ser. No. 19,913
2 Claims. (Cl. 117—17.5)

This invention relates to xerography and, in particular, to an improved transfer method for use in transferring xerographic images from a xerographic plate onto a transfer material.

In the process of xerography, for example, as disclosed in Carlson Patent 2,297,691, issued October 6, 1942, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the light intensity which reaches them and thereby creates an electrostatic latent image on or in the plate coating.

Development of the electrostatic latent image is effected with developing material, usually including suitable pigmented powder, hereinafter referred to as toner powder. In the development of the electrostatic latent image, the toner powder is brought into surface contact with the xerographic plate and is attracted thereto electrostatically in a pattern corresponding to the electrostatic latent image. Thereafter, the developed xerographic image is usually transferred to a support material, such as paper or like materials, to which it may be permanently fixed by any suitable means.

A satisfactory image transfer process must be capable of consistently producing high-quality prints, must not damage the plate as the result of heat, pressure, chemical reaction or electrical breakdown, and must remove all or substantially all of the developed image on the plate.

Electrostatic image transfer has been used successfully for some time in the transfer of images from a xerographic plate onto transfer material. In this technique, the powder image is subjected to an electric field between the back of the xerographic plate and the paper on which the image is to be transferred. The electric field causes the charged powder particles to adhere to the paper forming a visible image.

Present commercial xerographic line-copy processors utilize electrostatic transfer of the powder image; the electric field necessary for powder transfer is formed by the deposition of electric charge on the paper sheet which is in contact with the powder. The charge deposited on the paper may be generated by a high-voltage discharge in proximity to the surface of the paper or it may be applied by means of a conductive cylinder in contact with the paper as disclosed by Fitch Patent 2,807,233, issued September 24, 1957. As disclosed in the Fitch patent, to effect a positive-to-positive image reproduction a positive potential is applied to the conductive cylinder, whereas to effect a negative-to-positive image reproduction a negative potential is applied to the conductive cylinder. It is apparent then that in known methods of electrostatic transfer of images from a xerographic plate to a transfer material a unidirectional charge is applied to the back of the transfer material. Thus in the case of the apparatus disclosed in the Fitch patent, referred to herein, a direct current supply is required to operate the transfer mechanism.

It is, therefore, an object of this invention to improve image transfer apparatus for transfer of xerographic powder images, the apparatus being simple and compact in use and structure and being efficient in operation.

Another object of the invention is to improve image transfer apparatus to effect transfer of images from a xerographic plate to a support material by the use of alternating current.

It is a further object of the invention to provide apparatus for bringing a support material into uniform pressurized contact with a surface bearing a transferable xerographic powder image for transferring the xerographic powder image from said surface to the support material by electrostatic transfer.

It is a still further object of the invention to provide an image transfer pressure roller apparatus for use in the transfer station of a xerographic machine.

For a better understanding of the invention as well as other objects and further features thereof, reference is had to the following detailed description of the invention to be read in connection with the accompanying drawings, wherein.

Figure 1:
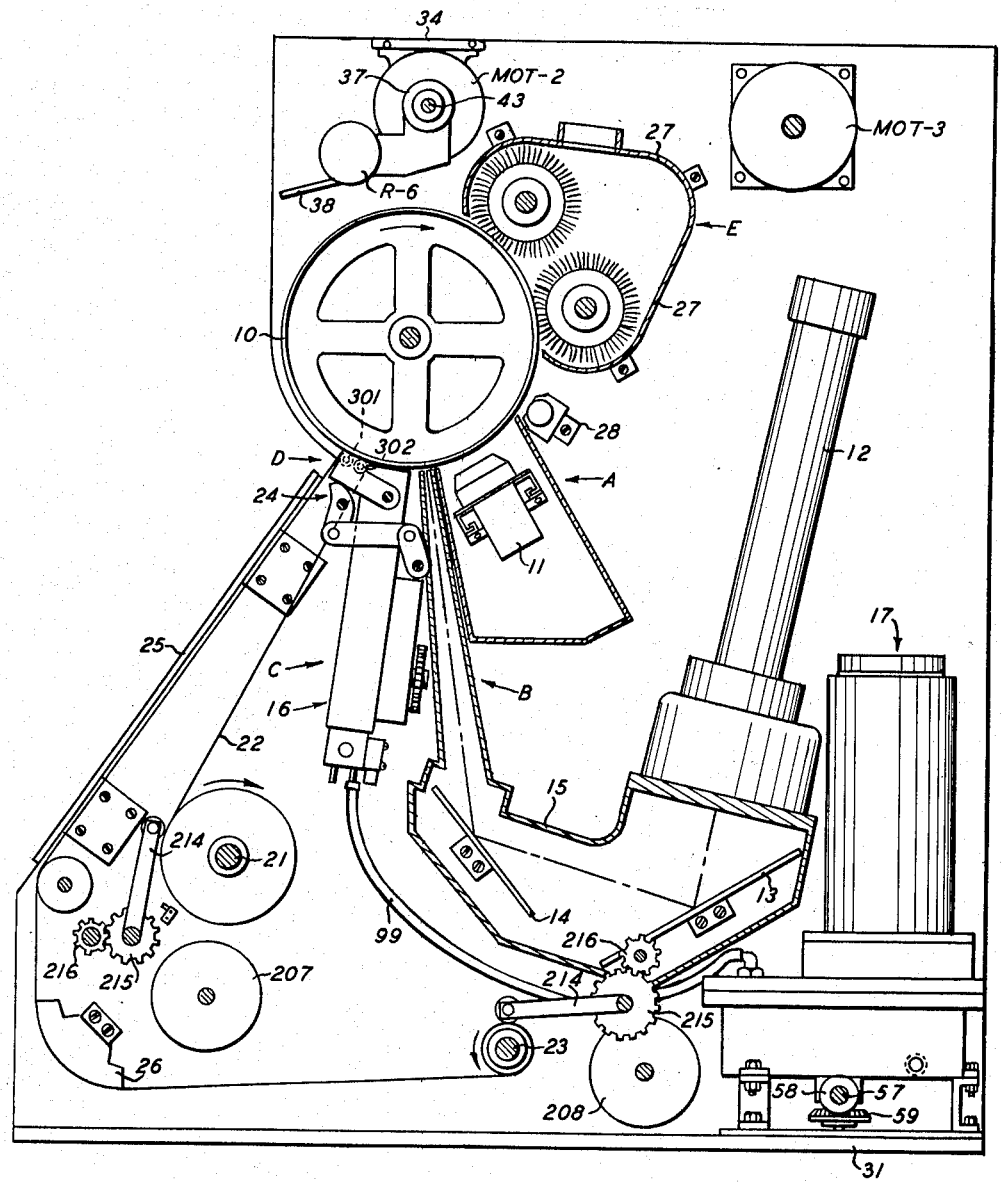
FIG. 1 is a schematic view of an automatic xerographic reproducing apparatus employing a transfer mechanism constructed and operated in accordance with the invention.
Figure 2:
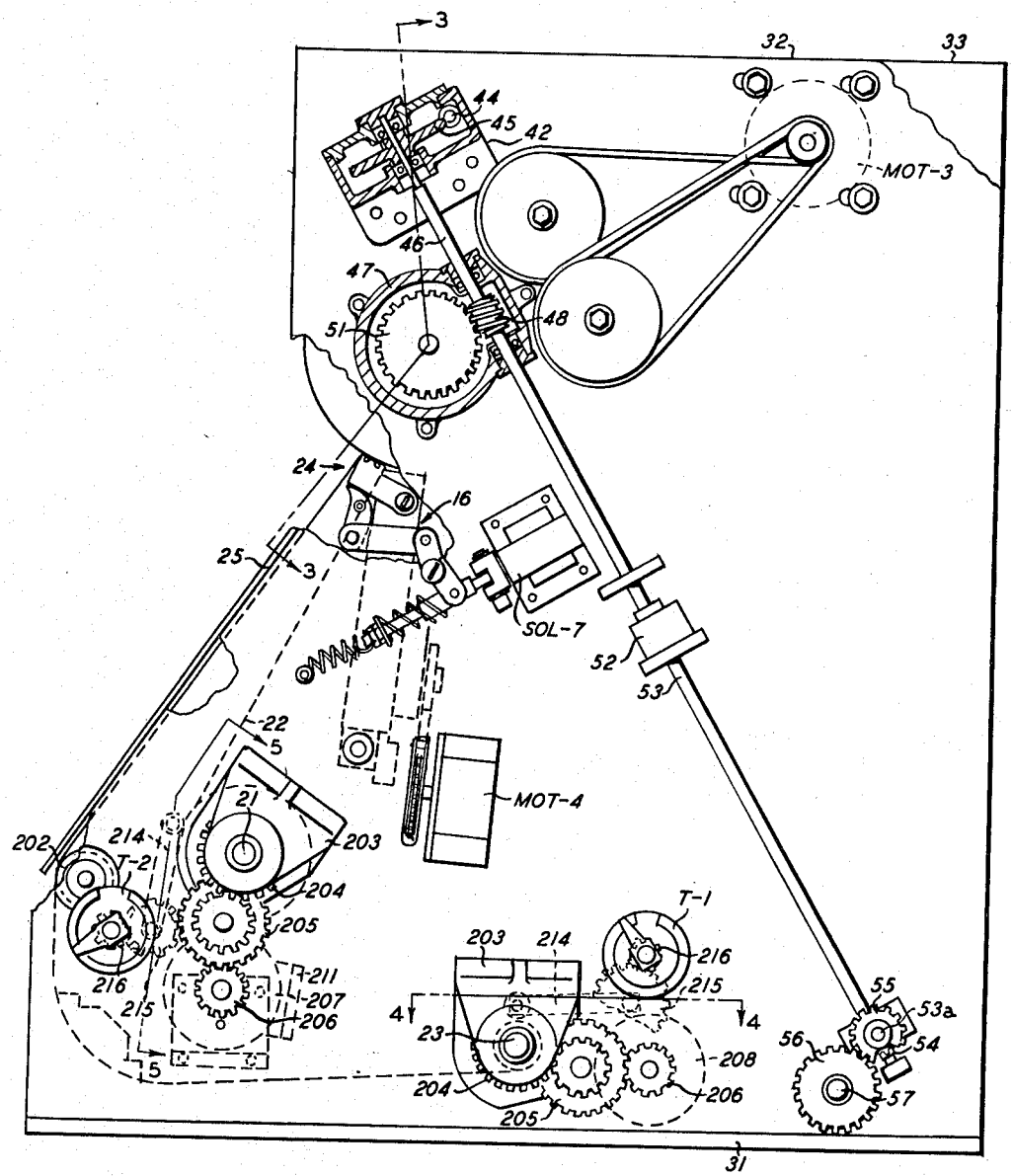
FIG. 2 is a right-hand view of a xerographic reproducing apparatus.

Referring now to the drawings there is disclosed a preferred embodiment of a variable speed xerographic processor for producing continuous tone images. Specifically, the apparatus shown is a close-access xerographic recorder for use in an aircraft to produce permanent continuous tone images on a transfer material from suitable infrared or radar images of the objects to be reproduced while at the same time permitting members of the aircraft to view these images within a relatively short period of time.

As shown in the figures the variable speed xerographic apparatus comprises a xerographic plate including a photoconductive layer or radiation-receiving surface on a conductive backing and formed in the shape of a drum, generally designated 10, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are directed over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus includes a corona discharge device 11 which consists of an array of one or more corona discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members to expose the charged xerographic drum to a radiation image, which then causes a release of the charge on the drum in proportion to the radiation from the copy onto the surface of the drum. As shown, the exposure mechanism includes a cathode ray tube 12 connected to a suitable electronic circuit, not shown or described since it forms no part of the instant invention. Images projected by the cathode ray tube onto the image mirror 13 are reflected onto object mirror 14 for projection onto the xerographic drum, the entire projection system being enclosed in a suitable exposure housing 15 to exclude extraneous light.

Adjacent to the exposure station is a developing station C in which there is positioned a development electrode 16 which is mounted to maintain a uniform close spacing between its upper surface and the surface of the xerographic plate to form a development zone therebetween. The development electrode 16 is supplied with a powder cloud by powder cloud generator 17.

Positioned next and adjacent to the developing station is the image transfer station D which includes a web feeding mechanism to feed a web of paper or other suitable transfer material to the drum and a transfer mechanism to effect transfer of a developed xerographic powder image from the drum onto the transfer material. The web feeding mechanism includes a supply roll 21 for a web of transfer material 22 which is fed up and over transfer mechanism 24 into transfer contact with the drum and then down under a viewing platen 25 across a fusing apparatus, such as heat fuser 26 having a resistance heating element R-1 therein, whereby the developed and transferred xerographic powder image on the transfer material is permanently fixed thereto from whence it is wound onto take-up roll 23.

The next and final station in the device is a drum cleaning station E, having positioned therein a plate cleaner 27 adapted to remove any powder remaining on the xerographic plate after transfer by means of motor MOT-3 driven brushes and a light source 28, having a lamp LMP-2 therein, adapted to flood the xerographic plate with light to cause dissipation of any residual electrical charge remaining on the xerographic plate.

Suitable drive means and circuit means described hereinafter are used to actuate the drum, development electrode, powder cloud generator, web feed mechanism and the plate cleaning device.

Referring now to the figures for detail structural features of the device, there is provided a frame for supporting the components of the apparatus formed by base plate 31 and side plates 32 and 33. These plates are connected together by suitable means and the side plates are rigidly maintained in spaced relation to each other by suitable tie plates, such as plate 34.

The xerographic drum 10 is mounted on horizontally driven drum shaft 36 journaled in the side plates and the housing of gear unit 47 with the drum positioned between the side plates and the major xerographic components of the machine mounted around the drum.

For driving the drum at a variable speed there is secured to plate 34 a motor MOT-2 connected by shaft coupling 41 to the input shaft of a conventional variable speed drive 37, the output speed of which can be controlled by control shaft 38 which may be either manually or automatically manipulated to vary the speed of the drum in relation to changes, for example, in the ground speed of the aircraft.

The output shaft of the variable speed drive 37 is connected by a second shaft coupling 41 to the horizontal or drive shaft 43 of a conventional right angle gear unit 42 secured to side plate 32. Drive shaft 43 has worm 44 thereon to drive the worm gear 45 on one end of shaft 46, which as shown, is the driven shaft of gear unit 42 and the drive shaft of a second right angle gear unit 47 also secured to the side plate 32. Worm 48 on shaft 46 drives worm gear 51 secured to the driven shaft or drum shaft 36 of this gear unit.

Shaft 46 also effects operation of the powder cloud generator 17, the shaft 46 being connected by a magnetic clutch 52, designated in the electrical circuit as solenoid SOL-4, to shaft 53 having bevel gear 54 thereon which engages another bevel gear or shaft 53a to drive gear 55. Gear 55 drives gear 56 on one end of shaft 57, the other end of the shaft being coupled by gears 58 and 59 to the drive shaft of the powder cloud generator.

CHARGING APPARATUS

In general, the electrostatic charging of the xerographic plate in preparation for the exposure step is accomplished by means of a corona generating device whereby an electrostatic charge is applied to the plate surface as it moves relative to the charging device.

Although any one of a number of types of corona generating devices may be used to charge a xerographic plate, a scorotron and its control circuit of the type disclosed in copending application Serial No. 19,846 now Patent 3,062,956, filed concurrently herewith in the name of Joseph J. Codichini on April 4, 1960, is used to uniformly charge the xerographic plate at various plate speeds.

DEVELOPMENT SYSTEM

In order to effect development of the electrostatic latent image on the cylindrical xerographic plate, the developing system shown includes a developer apparatus which coacts with the xerographic plate to form a development zone wherein the charged and exposed surface of the xerographic plate is developed to form a visible image of the copy.

Although any suitable developer apparatus may be used, a moving screen development electrode 16, of the type disclosed in copending application Serial No. 19,952, filed concurrently herewith in the names of John T. Bickmore, Harold Bogdonoff, and William J. Burris on April 4, 1960, is used in the xerographic reproducing mechanism.

The moving screen development electrode is positioned adjacent to the xerographic plate, with the movable screen element of the development electrode in closely spaced relation to the xerographic plate for movement in a path normal to the direction of travel of the xerographic plate, the development electrode coacting with the portion of the xerographic plate immediately adjacent thereto to form a development zone wherein the charged and exposed xerographic plate is developed by a development material, usually in the form of a powder referred to as toner. For reasons described hereinafter, the toner used in the subject apparatus is a toner such as carbon black, which is electrically conductive.

Compressed aeriform fluid from a suitable source such as a commercial compressor (not shown) is delivered through suitable valved conduits to a powder cloud generator 17 of the type disclosed in copending application Serial No. 19,845, filed concurrently herewith in the name of Charles L. Huber on April 4, 1960, now Patent No. 3,094,248. Within the powder cloud generator metered quantities of developer material are dispersed in the compressed aeriform fluid to be delivered through conduit 99 to the development electrode for discharge into the development zone through the movable screen element.

For moving the screen element of the development electrode a motor MOT-4 is connected through a suitable drive mechanism to the screen element.

Figure 8:
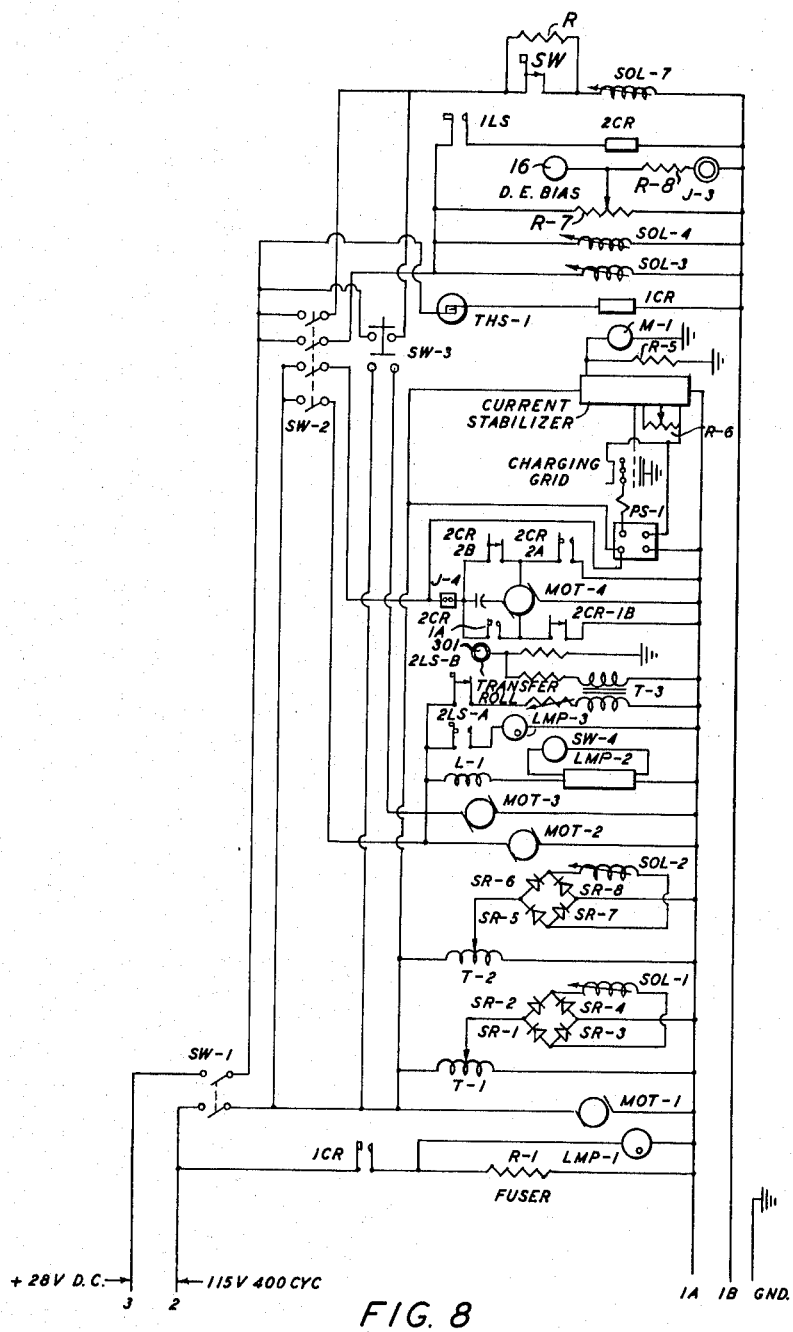
FIG. 8 is a schematic wiring diagram of the electrical circuit of the apparatus.

To permit the screen to be moved first in one direction and then in the opposite direction, motor MOT-4 is adapted to rotate either clockwise or counterclockwise by merely reversing the polarity of the incoming power. As shown in FIG. 8 which illustrates diagrammatically the electrical circuit of the machine, a mechanically actuated switch 1LS is used to energize a control relay 2CR for reversing the polarity of the power to the motor MOT-4.

TRANSFER STATION

Sheet Feeding Mechanism

Since a xerographic plate, unlike photographic film, is reusable, it is desirable to transfer the developed xerographic powder image from the xerographic plate to a suitable support material to form a permanent reproduction of the image copied. The support material may be any suitable material, usually paper, either in web or cut-sheet form. In the embodiment shown the support material is in web form for reasons described hereinafter.

As shown, a supply of support material such as a plastic-coated paper, hereinafter referred to as a paper web 22, is supported by a supply roll 21 from which it is fed upwardly to and over a transfer mechanism 24 into transfer contact with the xerographic plate, then down and around an idler roller 202, around heat fuser 26 having a resistance heating element R-1 therein, to the takeup roll 23. A continuous web of support material is used in the subject machine so that an operator stationed at the front of the apparatus may view the transferred images on the paper web as it is fed from the transfer mechanism under the viewing plate 25 across the idler roller to the heat fuser. Referring now to FIG. 1, it can be seen that by using a development electrode of the type disclosed herein, and a transfer mechanism of the type described hereinafter, the operator can view the developed and transferred images on the paper web within a matter of seconds after the xerographic plate has been exposed.

The supply roll 21 and take-up roll 23, both of conventional design, are journaled in frame plates 32, 33 and in bearing brackets 203 secured to frame plate 32, each roll being provided with a gear 204 outboard of frame plate 32.

Gear 204 on the supply roll is part of a gear train consisting of compound gear 205 and gear 206 connected to a hysteresis brake 207. Gear 204 on the take-up roll is part of a similar gear train consisting of compound gear 205 and gear 206 connected to the output shaft of hysteresis clutch 208. The output shaft of hysteresis clutch 208 is journaled in frame plate 32 and the input shaft of this clutch is journaled in pillow block 211 and connected to speed reducer 212 driven by paper take-up motor MOT-1. The hysteresis brake 207 is secured in frame plate 32 by brackets 213.

As shown in FIG. 8 the paper take-up motor MOT-1, the field of the hysteresis clutch 208 and the field of the hysteresis brake 207 are suitably connected to a source of power. The hysteresis clutch 208 and the hysteresis brake 207 are represented schematically in the electrical circuit as solenoids SOL-1 and SOL-2, respectively. These units are used to apply the proper tension to the paper web, the web being driven by the drum and a roll of the transfer device which grips the paper web with sufficient tension to draw it from the supply roll. In order to tension the paper web there must be a resisting force as well as a pulling force. The resisting force in the paper feed system is applied by brake 207 and the pulling force is applied through clutch 208.

To compensate for the changes in the pulling force on the webs as the paper web is transferred from the supply roll to the take-up roll, each roll is provided with a dancer roll 214 riding on the paper web to sense the amount of support material on the rolls. Each dancer roll is connected through gears 215 and 216 to the rotatable element of a Variac designated T-1 for use in controlling the voltage to the clutch 208 and T-2 for use in controlling the voltage to brake 207. Using the clutch 208 as an example, when the dancer roll is resting on the core of take-up roll 23, minimum voltage should be applied to the clutch and when it is resting on a completed roll maximum voltage should be applied to the clutch.

TRANSFER MECHANISM

Referring now to the subject matter of the invention there is provided in the transfer station of the xerographic reproducing apparatus a preferred embodiment of a transfer apparatus constructed and operated in accordance with the invention.

In the formation of a visible xerographic image, a previously formed electrostatic latent image on a xerographic plate is developed by means of a developer material, or toner as it is referred to in the art. Although various materials have been used as a toner, they can be classified as either insulating toners or conductive toners as determined by their electrical properties. Thus toners, such as the pigmented resin type are classified as insulating toners whereas toners such as carbon black are classified as conductive toners.

To date electrostatic transfer of images, developed by either type of toner, from a xerographic plate to a support material has been accomplished by applying a charge (to the back of the support material) of opposite polarity to the charge applied to the toner to effect development.

Now in accordance with the invention, method and apparatus has been devised that will permit electrostatic transfer of xerographic images developed with conductive toners through the application of an alternating current potential to a support material.

In accordance with the method of the invention, the electrostatic latent image on a xerographic plate is first developed with a conductive toner by any suitable process. To effect transfer of the image, a support material having greater resistivity than the xerographic plate is placed in contact with the image surface of the xerographic plate and then a high voltage alternating current potential is applied to the support material to effect actual transfer of the toner image from the xerographic plate to the support material.

Although the method of electrostatic transfer using an alternating potential to effect transfer can be done by hand, as, for example, by using a conductive-covered rubber roller connected to a 60-cycle alternating potential of at least 1,000 volts hand-held and rolled over a sheet of support material superimposed over a conductive toner developed electrostatic latent image on a flat xerographic plate, it is apparent that a suitable transfer mechanism must be used to effect electrostatic transfer automatically and continuously in a xerographic reproducing machine of the type disclosed herein.

The transfer of the xerographic powder image from the surface of the xerographic plate to the support material in the xerographic reproducing apparatus illustrated herein is effected by means of transfer mechanism 24 that is located immediately after the development electrode 16 in the direction of movement of the plate, the transfer mechanism 24 being adapted to lightly force the support material into contact with the xerographic plate, the actual transfer being effected by the application of an alternating current to the back of the support material, the charge being applied to he support material by means of a conductive roller.

The preferred embodiment of the transfer mechanism 24, as shown, includes a transfer roller 301 around which the paper web is transported into contact with the xerographic plate. Transfer roller 301 is desirably made of conductive rubber on a conductive metal core. The outer shell of the transfer roller is made of conductive rubber or other conductive resilient material so as to compensate for any surface irregularities in the plate surface or paper web, thus preventing damage to the plate surface as it forces the paper web into contact therewith and permitting a charge to be applied through the conductive material to the back of the support material. As shown in FIG. 8 the transfer roller is suitably connected to a source of alternating current potential. During the transfer process an alternating current potential of at least 1,000 volts is applied to the transfer roller to effect electrostatic transfer of the xerographic powder image from the plate surface to the paper web.

Figure 3:
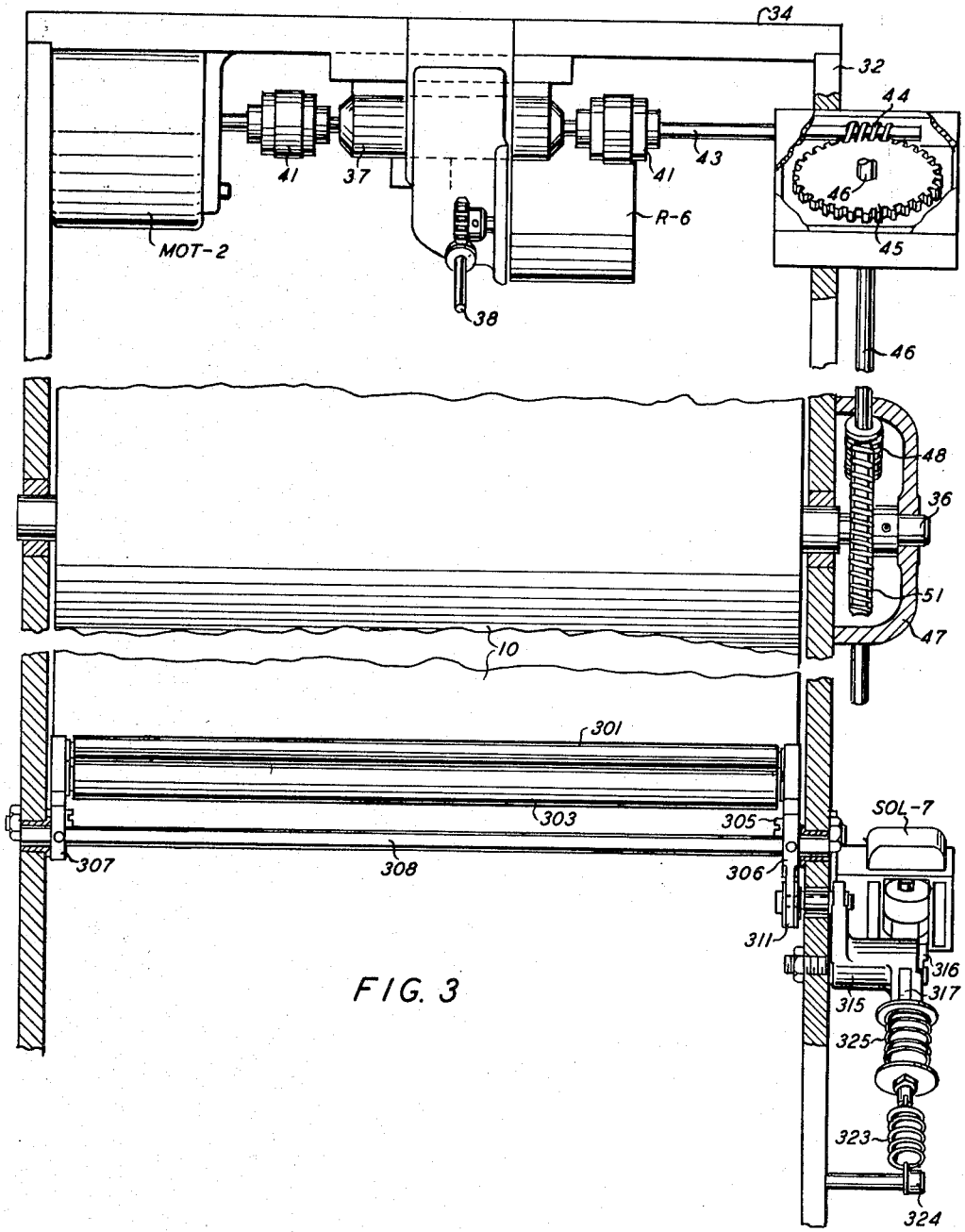
FIG. 3 is an enlarged view partially in section taken along the line 3—3 of FIG. 2.
Figure 4:
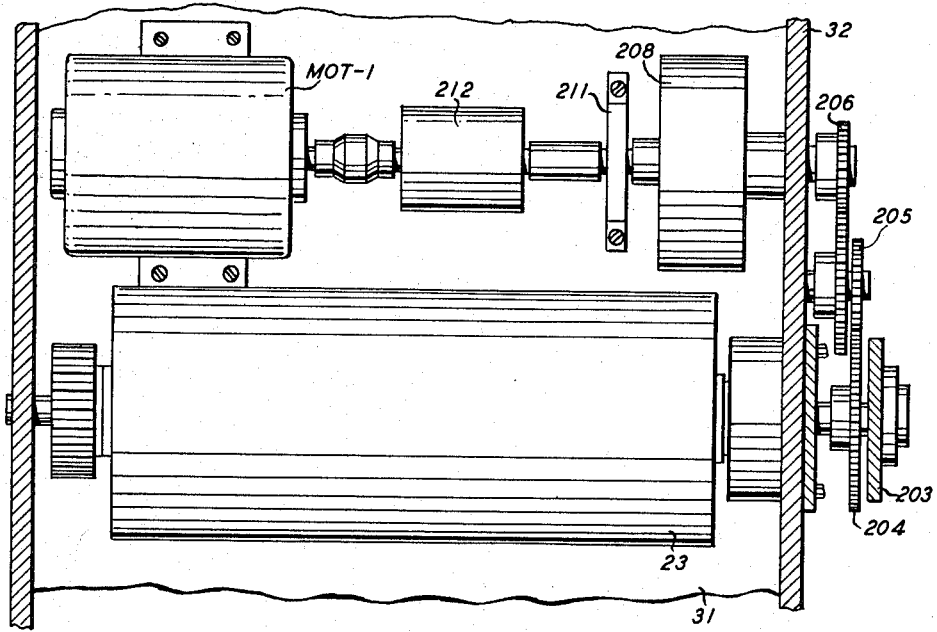
FIG. 4 is an enlarged view of a paper take-up assembly taken along line 4—4 of FIG 2.
Figure 5:
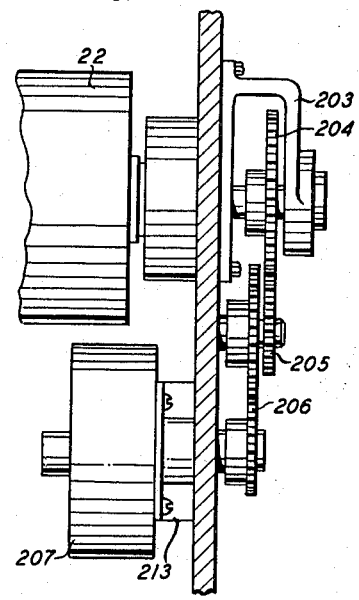
FIG. 5 is an enlarged view taken along line 5—5 of FIG. 2.
Figure 6:
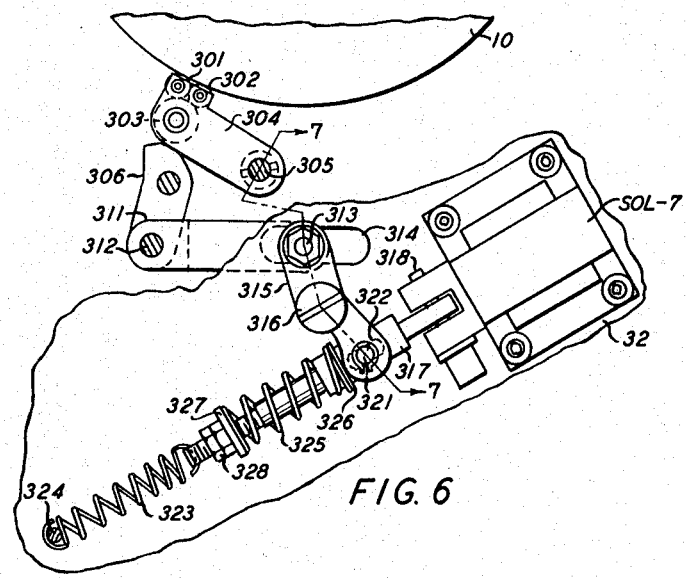
FIG. 6 is an enlarged side view of the transfer mechanism of the invention with parts broken away to show details of construction.
Figure 7:
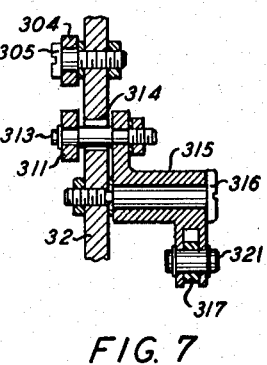
FIG. 7 is an enlarged sectional view taken along line 7—7 of FIG. 6.

As shown, especially in FIGS. 3, 6 and 7, the transfer roller 301, which is of a length at least equal to the width of the image-producing area of the xerographic plate, is journaled at opposite ends in lever arms 304 pivotally secured by shoulder bolts 305 to the inner faces of frame plates 32 and 33.

Because of the charge placed on the transfer roller, powder images on the plate in the immediate vicinity of the transfer roller tend to jump off of the plate at random. If this occurs while the paper web is near the drum but not yet in contact therewith, a powder image will be partly transferred to the paper web before it is in contact with the drum 10 and the remainder of the powder image will be transferred to the paper web as it passes between the transfer roller and the plate in contact therewith.

Because of the curvature of the plate and because the charge radiates from the transfer roller in various directions this pre-transfer of a powder image results in an image on the support material which is out of registration with the final powder image transfererd onto the paper web. To prevent this from occurring there is provided a guide 302, herein shown as a roller journaled in the lever arms, positioned in advance of the transfer roller to force the paper web into intimate contact with the drum surface as it rotates toward the transfer roller 301.

Since in the embodiment of the xerographic apparatus disclosed it is desirable to view the xerographic powder images as soon as possible after they are developed, both the transfer roller and guide 302 are made relatively small in diameter and, as such, these elements are mechanically weak and need to be supported from flexing away from the plate by back-up roll 303 also journaled in the lever arms 304.

Cams 306 and 307 secured to cam spindle 308 journaled in the frame plates 32 and 33 are positioned to contact the lever arms 304 to move the transfer roller from a first position in which it is in cooperative relation to the plate to be driven by frictional engagement with the plate or with a paper web interposed therebetween. The lower end of cam 306 is pivotally positioned in the bifurcated end of lever 311 by pin 312. The opposite end of lever 311 is pivotally secured to one end of stud pin 313 which extends through an elongated slot 314 in frame plate 32 and has its opposite end journaled in and secured to one end of crank arm 315 pivotally secured by means of shoulder bolt 316 to frame plate 32.

For actuating this lever system there is provided an actuator arm 317 secured by pins 318 to the bifurcated end of the solenoid plunger of normally open solenoid SOL-7 secured to frame plate 32. The opposite end of bifurcated end of crank arm 315 is pivotally secured to the actuator arm 317 by means of actuator pin 321 extending through a slot 322 in the actuator arm and a suitable aperture in the crank arm. Spring 323 secured at one end to bolt 324 in frame plate 32 and at its opposite end to actuator arm 317 will bias the solenoid plunger to its extended position when the circuit to solenoid SOL-7 is open to thereby actuate the lever system to permit the transfer roller to fall by gravity or by tension of the paper web away from the xerographic plate when the machine is not in operation and to permit threading of the paper web around the transfer roller and guide.

To permit adjustment of the contact pressure of the transfer roller with the xerographic plate to say, for example, a pressure of approximately five pounds per inch of roller length, and to prevent sudden impact damage to the xerographic plate when the transfer roller is pressed into contact thereon, there is provided spring 325 encircling the actuator arm with one end of the spring abutting spring washer 326 slidably positioned and biased against the crank arm and the other end of the spring butting against washer 327 adjustably positioned by nuts 328 on the threaded end of the actuator arm.

MACHINE OPERATION

Continuing the general description of the xerographic reproducing apparatus, a clearer understanding of its operation can best be obtained by reference to the schematic wiring diagram of FIG. 8 and the following description.

The entire assembly of the apparatus is energized by closing a start button or switch SW-1, which is a single throw two-pull switch, connecting the assembly to suitable sources of power. Because of the specific application for which the apparatus is intended, two power sources are used to energize the assembly, namely, a 28-volt direct current power source and a 115-volt 400 cycle alternating current power source.

Upon the closure of switch SW-1 the thermostat THS-1 is energized. This thermostat controls the actuation of the control relay 1CR which has a contact 1CRA in series with the resistance heating element R-1 of the fuser 26 connected across the lines of the incoming alternating current source. When contact 1CRA is closed power is supplied to the resistance heating element R-1 and indicator lamp LMP-1 which is in parallel with the resistance element R-1, the lamp serving as an indicator to the operator that the fuser is in operation.

On the 115-volt line, closure of switch SW-1 permits the paper take-up motor MOT-1 to be energized along with the solenoids SOL-1 and SOL-2 of the hysteresis clutch 208 and hysteresis brake 207, respectively. Paper take-up motor MOT-1 is left continuously operated; however, the take-up roll 23 is only driven when the power supply to the hysteresis clutch is sufficient to overcome resistance to the take-up roll. The power applied to the solenoid SOL-1 of the hysteresis clutch is controlled by the Variac T-1 so that the torque applied to the take-up roll 23 is equivalent so the braking power applied to the supply roll 22. This latter force is applied by solenoid SOL-2 of the hysteresis brake which is controlled by Variac T-2 as previously described.

In this manner the paper web is maintained in proper tension to permit it to be advanced by reason of its contact between the rollers of the transfer mechanism 24 and the drum 10 as the latter is driven. At the same time the electronic elements of the high voltage power supply PS-1 and the current stabilizer circuit CS-1 of the type disclosed in copending application Serial No. 19,846, filed concurrently herewith in the name of Joseph J. Codichini on April 4, 1960, are energized to permit these elements to warm up before the actual operation of the machine is started.

Next a switch SW-2 is closed to energize the remaining elements of the apparatus to effect continuous automatic operation of the machine. When this occurs the drum drive motor MOT-2 is energized to drive the drum 10 and the powder cloud generator (previously loaded with toner and connected to a source of pressurized aeriform fluid) through the mechanical drive previously described, the powder cloud generator being driven through the generator drive clutch 52 which is energized at this time by the energization of the generator drive solenoid SOL-4 on the 28-volt circuit.

Power applied at this time to the charging grid of the scorotron will cause a uniform electrostatic charge to be imposed upon the drum as it rotates therebeneath.

An electrostatic latent image is formed on the drum as it rotates through the exposure station conforming to the light or radiation pattern projected on the drum. In the apparatus shown exposure is made by means of a cathode ray tube 12 controlled by a circuit independent of the machine control circuit and therefore not shown or described herein since it forms no part of the instant invention.

As the drum rotates through the developing station toner particles are directed between the drum and the biased development electrode, the toner being drawn to the electrostatic latent image on the drum to form a powder image. Motor MOT-4, used to drive the drive mechanism of the development electrode first in one direction and then in the opposite direction, is energized through the normally closed contacts 2CR-1B and 2CR-2B of control relay 2CR. When switch 1LS is actuated power is transmitted to control relay 2CR. As control relay 2CR is energized, its contacts 2CR-1B and 2CR-2B will open and its contacts 2CR-1A and 2CR-2A will close to reverse the polarity of the incoming power to the motor thereby reversing the direction of rotation of the motor.

As the drum continues to rotate it passes through the transfer station whereby transfer of the powder image from the drum to the paper web is effected by the alternating current potential applied to the transfer rolls 301, power being supplied to the transfer roll upon the closure of switch SW-2, the contact 2LSB being normally closed to supply power to the primary of transformer T-3, the secondary of which is connected to the transfer roll. To permit variation of the bias applied to the transfer roll there is provided a variable resistor R-9 in series with the transformer T-3.

Also when switch SW-2 is closed solenoid SOL-7 is energized to activate the mechanical linkage of the transfer mechanism to force the rolls 301 and 302 into contact with the drum with the paper web sandwiched therebetween.

As the drum rotates through the cleaning station the residual powder on the drum is removed by the brushes of the drum cleaner 27 driven by motor MOT-3, and the drum is flooded with light from lamp LMP-2 to cause dissipation of any residual electrical charge remaining thereon, each of these elements having been energized upon closure of switch SW-2.

Normally closed limit switch 2LS is positioned for actuation by the dancer roll riding on the paper supply roll. When the supply of support material on the paper supply roll 21 is nearly exhausted the limit switch will be actuated by the dancer roll to open its contact 2LSB, thereby cutting off the potential applied to the transfer roll 301 to prevent damage to the xerographic plate when there is no support material between it and the transfer roll and at the same time contact 2LSA is closed to energize an end-of-paper-supply indicator lamp LMP-3.

When this occurs, switch SW-2 is opened by the operator, thus de-energizing the above-described elements controlled by switch SW-2 and then the normally open switch SW-3 is closed to energize the drum drive motor MOT-2 and solenoid SOL-7 of the transfer mechanism to run out the paper web on the supply roll without effecting a xerographic process on the apparatus. As previously described, contact 2LSB is now open at this time so that no potential is being applied to the transfer roll. It is noted that closure of switch SW-3 will also cause the brush motor MOT-3 and the discharge lamp LMP-2 to be energized although these elements are not necessary in the operation of paper run out.

Referring now again to the subject matter of the invention, the exact phenomenon occurring during electrostatic transfer of a conductive toner from a xerographic plate to a support material by the application of an alternating potential thereon is not specifically known; however, a theory for the phenomenon occurring during the process is advanced herein, as follows:

Consider two conducting planes spaced parallel to each other at a very small distance so that about 1,000 volts can be applied between them without incurring air breakdown. If very finely divided conducting particles rest within the gap they will be supported on the surfaces of the conducting planes. If we were to observe a given particle, we would see it suddenly leave one surface, jump the air gap and come to rest on the other surface for a time, then repeat the process back to the first plane and continue the cycle over and over as long as the field exists across the gap. An explanation for this occurrence is that charges are induced into the particle by the applied field and at a rate inversely proportional to the contact resistance of the particle to the surface it contacts. The growing charge experiences a force in the field that finally dislodges the particle and drives it across the gap where it loses its charge and acquires the opposite polarity charge at a rate proportional to its contact resistance with the second surface. It will spend an equal time in contact with each surface if—and only if—the contact resistances from the particle to each surface are equal. If the surfaces differ so that the contact resistance to one is significantly greater than the other the contact times of the particle to each surface will differ by the same proportion.

If this be true for thousands of particles of random phase relationship in their cycles back and forth, then it is likely that at any given time the total mass of particles on each surface is proportional to the average contact resistance of the particles to that surface.

In practice we must deal with surfaces of very low conductivity because the uniformly small air gap is impractical to maintain without an occasional contact that would short circuit the applied voltage.

Consider two low conductivity surfaces forming the uniformly small air gap. Assume one surface (the xerographic plate) initially carries a toner image consisting of small conductive particles. Assume further that the average contact resistance between the toner and this surface is only one-tenth that of the other surface (support material). Each particle (except the very small ones trapped by Van der Waals' forces) will spend one unit of time at the more conductive surface for every ten units of time at the more resistive surface (neglecting the minute time spent traversing the air gap). After a very short time necessary to establish randomness between particles the total image will reside one-eleventh on the first surface and ten-elevenths on the second so that transfer will be 91% efficient to the support material.

It is significant that nothing has been said about the polarity of the surfaces. Heretofore it has been the practice to use a positive potential to transfer images formed by previously charged negative toner and a negative potential to transfer images formed by previously charged positive toner without regard to whether a conductive or nonconductive toner was used to develop the electrostatic latent image on the xerographic plate. However, as now understood, to effect transfer of a conductive toner image from a xerographic plate to a support material, such as a plastic-coated paper, which is more resistant than the xerographic plate, there can be applied to the support material a charge of either field or an alternating field. Thus, it is now possible in accordance with the invention to use an alternating current potential to effect electrostatic transfer of conductive toner images from a xerographic plate.

Although in the apparatus shown a 400 cycle alternating current potential is applied to the transfer roll of the apparatus to effect electrostatic transfer, transfer can be effected by various cycles of alternating current as, for example, a 60 cycle alternating potential.

EXAMPLE

A rubber-covered roller having a 2.85 centimeter outside diameter with a rubber coating about 0.47 centimeter thickness was used to effect transfer. The rubber used in the roller was electrically conductive; the resistance of the roller when in contact with a flat xerographic plate being measured at about two megohms. A 60 cycle alternating current potential of 1,000 volts was applied to the roller and the roller was handled and moved at a speed of about 10 centimeters per second over the back of a plastic-coated paper superimposed over the conductive toner image on the xerographic plate. A weight of about nine pounds was applied to the roller to give moderate roller pressure on the paper. Although it could be expected that no transfer would occur at the time the alternating potential is zero, the roller contact was wide enough at a roller speed of about 10 centimeters per second to permit the transferring portions of the transfer cycle to overlap to produce a uniform transferred image.

While the invention has been described with reference to the structures disclosed herein, it is not confined to the details set forth since various modifications or changes will become apparent to those skilled in the art in view of applicants' disclosure. For example, although the transfer roller 301 and guide 302 have been shown as rollers to reduce friction on the web of support material, it is apparent that non-rotatable members could be used in place of the rollers. This application is therefore intended to cover such modifications or changes as may come within the purposes of the improvements or the scope of the following claims.

What is claimed is:

1. A method of electrostatically transferring an image developed with a conductive developing material on a xerographic plate, said method including superimposing upon the image on said xerographic plate a support material having an electrical resistivity greater than said xerographic plate and then applying to the back of the support material an alternating current potential of at least 1,000 volts.

2. A method of electrostatically transferring an electrostatic latent image developed with a conductive developing material on a xerographic plate to a support material, said method including superimposing a support material having an electrical resistivity greater than said xerographic plate upon the image on said xerographic plate and then applying to the back of the support material by means of a conductor in pressure contact therewith an alternating potential of at least 1,000 volts.

References Cited in the file of this patent

UNITED STATES PATENTS

| | | |
|---|---|---|
| 2,297,691 | Carlson | Oct. 6, 1942 |
| 2,626,865 | Mayo et al. | Jan. 27, 1953 |
| 2,857,290 | Bolton | Oct. 21, 1958 |
| 2,919,191 | Walkup | Dec. 29, 1959 |
| 2,951,443 | Byrne | Sept. 6, 1960 |
| 2,952,241 | Clark et al. | Sept. 13, 1960 |
| 2,953,470 | Green et al. | Sept. 20, 1960 |
| 2,954,006 | Lawrence | Sept. 27, 1960 |
| 2,955,052 | Carlson | Oct. 4, 1960 |
| 3,013,890 | Bixby | Dec. 19, 1961 |